United States Patent [19]
Harkin

[11] Patent Number: 5,966,142
[45] Date of Patent: Oct. 12, 1999

[54] OPTIMIZED FIFO MEMORY

[75] Inventor: Patrick A. Harkin, Austin, Tex.

[73] Assignee: Cirrus Logic, Inc., Fremont, Calif.

[21] Appl. No.: 08/933,679

[22] Filed: Sep. 19, 1997

[51] Int. Cl.$^6$ .............................. G06F 15/00; G06T 1/00
[52] U.S. Cl. ...................... 345/522; 345/197; 345/520; 712/207; 712/218
[58] Field of Search .......................... 345/418, 501–506, 345/520, 522, 507, 513, 197, 198, 508, 511; 395/381, 383, 394, 395; 712/205, 207, 218, 219

[56] References Cited

U.S. PATENT DOCUMENTS

| | | | |
|---|---|---|---|
| 5,689,720 | 11/1997 | Nguyen et al. | 395/800.23 |
| 5,793,386 | 8/1998 | Larson et al. | 345/522 |
| 5,796,413 | 8/1998 | Shipp et al. | 345/522 |
| 5,829,054 | 10/1998 | Ehlig et al. | 711/202 |

*Primary Examiner*—U. Chauhan
*Attorney, Agent, or Firm*—Steven A. Shaw; Robert V. Wilder

[57] ABSTRACT

A graphics system includes a graphics processor for rendering graphics primitives with a list of display parameters. A host processor generates a display list which includes an XY address for rendering the graphics primitives. A graphics processor, which includes a bypass logic circuit, enables the graphics processor to temporarily store display list commands in an internal storage device while previously fetched display list data is being processed. The bypass logic circuit allows the graphics processor to bypass the internal storage device and write fetched command directly to an execution unit in the graphics processor. By having the bypass capabilities, the graphics processor is able to optimize the internal storing of commands in the display list in the internal storage unit.

15 Claims, 4 Drawing Sheets

OPTIMIZED FIFO MEMORY

FIELD OF THE INVENTION

The present invention relates generally to information processing systems and more particularly to an improved graphics system for use with computer systems.

BACKGROUND OF THE INVENTION

Sophisticated graphics packages have been used for some time in expensive computer design and graphics systems. Increased capabilities of graphics controllers and display systems, combined with standardized graphics languages, have made complex graphics functions available in even the most routine applications. For example, word processor, spread sheets and desktop publishing packages now include relatively sophisticated graphics capabilities. Three-dimensional (3D) displays have become common in games, animation, and multimedia communication and drawing packages.

The availability of sophisticated graphics in PCs has driven a demand for even greater graphics capabilities. To obtain these capabilities, graphics systems must be capable of performing more sophisticated functions in less time to process greater amounts of graphical data required by modern software applications. In particular, there is a continuing need for improvements in software algorithms and hardware implementations to draw three-dimensional objects using full color, texture mapping and transparency blending.

Improvements have been made in the hardware realm. Graphics processors and accelerators are available with software drivers that provide an interface between a host central processing unit and graphics processors. In general, the graphics software receives information for drawing objects on a computer screen, calculates certain basic parameters associated with the objects and provides input to the graphics processor in the form of a "display list" of parameters.

A graphics processor then uses the display list values in generating the graphics objects to be displayed. The graphics processor may use interpolation techniques where the fundamental information for the object to be drawn comprises a series of initial and incremental parameters or values. The graphics processor loads or otherwise receives the initial parameters for the pixels to be drawn, and interpolates to draw the object by incrementing the parameters until the object is completely drawn.

Existing graphics implementations that use display lists typically load data in a sequential format to a register file in the graphics processor. For each type of primitive, a particular set of data values is required to render that type of primitive. For example, a point to be drawn to a pixel grid may require an "x,y" location, color value, and a "z" or depth value for depth comparison. Conversely, if the primitive is a line, the parameters required may also include a slope to describe the line's direction in the x direction, and a count value to define the length in the y direction.

An example of a display list is shown below in Table 1:

TABLE 1

| ADDRESS | NAME | DESCRIPTION |
|---------|------|-------------|
| 0X4000 | X | Initial X value |
| 0X4004 | Y | Initial Y value |
| 0X4008 | R | Initial Red value |

TABLE 1-continued

| ADDRESS | NAME | DESCRIPTION |
|---------|------|-------------|
| 0X400C | G | Initial Green value |
| 0X4014 | B | Initial Blue value |
| 0X4044 | Z | Initial depth value |

The display list provides the parameters required to draw points, lines, and polygons. The display list provided from the central processor or from memory provides data for the various registers in the register file. The display parameter values are processed by the graphics processor to render the corresponding graphics objects.

For example, a typical polygon may be divided into two separate adjacent triangles. A "main slope" technique requires the calculation of a "main slope" which is defined as the slope of the side that extends the entire vertical length of polygon. Two "opposite slopes" are determined which represent the slopes of the other two sides of the polygon. The slopes and dimensions of the polygon components are used in the creation of graphics images on display units.

In addition to the basic position and color parameters of a polygon, the graphics processor renders other parameters, such as texture parameters, as part of the polygon. These parameters are provided to the graphics processor in a display list generated by the central processing unit (CPU). The graphics processor executes the display list and renders the appropriate pixels for the polygon.

The rendering or interpolation of the graphics primitive is very process-intensive and requires the graphics processor to control the computer system bus or a dedicated communication link with the CPU. However, since prior art graphics processors do not have system bus-mastering capabilities, these graphics processors have to depend on the CPU to handle a bulk of the processing of graphics data in the computer system. Relying on the CPU to process most of the graphics data means that the graphics processor has to compete with other system resources for the CPU's bus bandwidth. This process can be time consuming and may lead to the loss of graphics data between the time such data are processed until the data are displayed on a display screen. The CPU dependence may also affect the overall system performance if there are many graphics applications running concurrently within the system.

It would be advantageous, therefore, if a graphics system were developed which could allow the graphics processor to have bus-mastership of the system bus in a computer system during a write operation of graphics primitive parameters and during renderings of graphics primitives.

It would be further advantageous if the host processor could transmit parameter values as part of the display list which would be internally stored in the graphics processor for subsequent writes to the register file in the graphics processor while the graphics processor is processing other instructions, and without incurring any extra write or clock cycles.

Thus, there is a need for a method of reducing the memory bandwidth of the graphics processor while rendering graphics primitives such as polygons within the graphics subsystem while maintaining the processing speed of CPU.

SUMMARY OF THE INVENTION

The foregoing and other needs are substantially met through provision of a method and a system for optimizing graphics commands processing in a graphics processor. The present invention enables the graphics processor to efficiently use the graphics processor's internal memory storage for both graphics commands and data when the supplied data is necessary for executing the graphics command.

Primitive parameter values are generated by software in a host processor and are provided to the graphics processor in the form of a display list. The display list generally includes operational code instructions (opcode) which indicate the type of command to be performed and the corresponding display data. In a preferred embodiment, the graphics processor includes a bus-mastering interface unit for fetching the display list either directly from the host processor or from system memory through a read operation. The bus-mastering interface unit allows the graphics processor to operate in a processor mode by assuming control of the system bus in the computer system in order to process the fetched graphics commands and data without any interruption from any other system resources in the computer system.

Through a bus-mastering interface unit, the graphics processor is able to fetch the display list directly from system memory to decode graphics commands and any associated data to determine where or how to internally store the commands and data.

A preferred embodiment also includes an internal memory storage unit in the graphics processor. The internal memory unit comprises a plurality of "First-In-First-Out" or "FIFO" registers for storing the fetched commands. Data fetched with the commands by the bus-master interface unit is decoded and stored in the FIFO registers. The FIFO registers are also used to buffer write operations in the graphics processor to a datapath unit in the graphics processor while the graphics processor is fetching or processing pre-fetched data.

The described embodiment provides the advantageous functionality of a graphics processor capable of internally grouping register writes into a sequential write operation to perform a continous write to a register file with a given display list instructions without having to register skip.

The bus-mastering interface unit further includes decoding logic which enables the bus-mastering interface unit to decode the fetched graphics commands from system memory while stalling the passing of already decoded commands on to the FIFO registers. Stalling the passing of commands on to the FIFO registers allows an execution unit in the graphics processor to empty data already stored in the FIFO registers for a primitive being rendered without interrupting the operation of the bus-mastering interface unit.

The preferred embodiment is able to maximize the use of the FIFO registers by stalling the passage of commands to the FIFO registers, and arranging only commands that require corresponding data to be fetched so that subsequent burst of data from subsequent commands can utilize the FIFOs effectively.

A preferred embodiment further includes an adder logic circuit which couples to the bus-mastering interface unit to allow the bus-mastering interface unit to bypass the FIFO register and provide decoded commands directly to the execution unit for processing.

Accordingly, the graphics processor in a preferred embodiment is able to effectively utilize the bus-mastering capabilities of the graphics processor while rendering graphics primitive internally and at the same time optimizing the internal storage of the fetch commands in order to speed up X and Y pixel address fetches to render a polygon in a single clock cycle.

BRIEF DESCRIPTION OF THE DRAWINGS

A better understanding of the present invention can be obtained when the following detailed description of a preferred embodiment is considered in conjunction with the following drawings, in which.

DETAILED DESCRIPTION

In the following detailed description, numerous specific details are set forth in order to provide a thorough understanding of the present invention. However, it will be obvious to one skilled in the art that the present invention may be practiced without these specific details or by using alternate elements or methods. In other instances; well known methods, procedures, components, and circuits have not been described in detail so as not to unnecessarily obscure significant aspects of the present invention.

Some portions of the detailed description which follow are represented in terms of procedures, logic blocks, processing, and other symbolic representations of operations on data bits within a computer system. These descriptions and representations are the means used by those skilled in the art to most effectively convey the substance of their work to other skilled in the art. A procedure, logic block, process etc., is herein, and generally, conceived to be a self-consistent sequence of steps or instructions leading to a desired result. The steps are those requiring physical manipulations of physical quantities. Usually, signals capable of being stored, transferred, combined, compared, and otherwise manipulated in a computer system. For reasons of convenience, and with reference to common usage, these signals are referred to as bits, values or the like with reference to the present invention.

Unless specifically stated otherwise as apparent from the following discussions, it is understood that thorough discussions of the present invention, discussions utilizing terms such as "processing" or "computing" or "calculating" or "determining" or "displaying" or the like, refer to the action and processes of a computer system, or similar electronic computing device, that manipulates and transforms data. The data is represented as physical (electronic) quantities within the computer system's registers and memories and is transformed into other data similarly represented as physical quantities within the computer system memories or registers or other such information storage, transmission or display devices.

Figure 1:
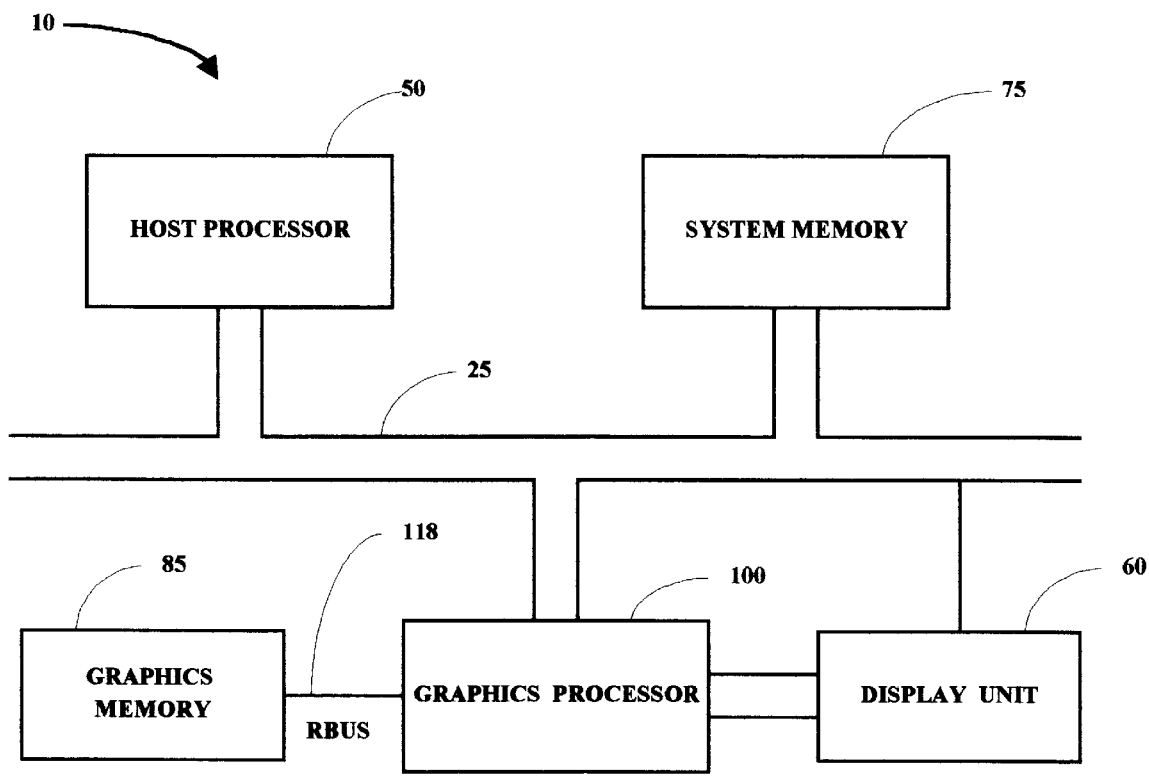
FIG. 1 is a simplified block diagram of a computer system having a graphics processor in accordance to the teaching of the present invention.

With reference to FIG. 1, a block diagram is shown of a host computer system 10 used by the preferred embodiment of the present invention. In general, host computer 10 comprises a bus 25 for communicating data and instructions, a host processor (CPU) 50 coupled to bus 25 for processing data and instructions, a computer readable memory unit 75 coupled to bus 25 for storing data and instructions from the host processor 50.

The host processor 50 provides data and control signals via bus 25 to a graphics hardware subsystem. The computer system 10 includes a graphics processor 100 which executes a series of display instructions found within a display list. The graphics processor 100 supplies data and control signals to a buffer or graphics memory 85. Graphics memory 85 is implemented for refreshing screens of a display device 60. The display device 60 utilized with the computer system 400 of the present invention can be a liquid crystal device, cathode ray tube, direct retina simulator (such as the Virtual Retinal Display (VRD) from Microvision with offices in Seattle, Wash., VRD's are described in U.S. Pat. Nos. 5,467,104 and 5,596,339) or other display device suitable for creating graphics images and alphanumeric characters recognizable to the computer user.

In a preferred embodiment, the graphics processor 100 provides hardware support for 2D and 3D graphics, and for text and windowing operations of a computer system. The graphics processor 100 transfers digital data from the system memory 75 or host processor 50, and processes data for storage in graphics memory 85 ultimately for display on the display unit 60. Graphics memory 85 in the present example, is a RAMBUS™ type dynamic random access memory device, but may also be comprised of synchronous RAM (SRAM), synchronous graphics RAM (SGRAM), Extended Data Out (EDO) RAM, etc.

The host processor 50 and system memory 75 both preferably communicate with the graphics processor 100 via the system bus 25. The system bus 25 may be, for example, the peripheral component interconnect or so called "PCI" bus.

Still referring to FIG. 1, the graphics processor 100 couples to the system bus 25. In accordance with the preferred embodiment, the graphics processor 100 includes bus-mastering capabilities, thus permitting graphics processor 100 to bus-master the system bus 25.

In the preferred embodiment, graphics memory 85 is comprises a bank of RDRAM buffers, and the digital data stored in the RDRAM comprises a rectangular array of picture elements referred to as "pixels" or "pixel values". Each pixel can be defined by an 8 bit value. For example, the intensity of a single color component of a corresponding pixel on a screen of the display unit 60 is typically defined by an 8 bit value.

The RDRAM frame buffer 85 provides a performance improvement by permitting faster access to display list instructions and pixel data, compared to accessing data stored in the main memory 75 of the host computer system 10. The graphics processor 100 communicates to the RDRAM buffer 85 through address, data and control lines, collectively referred to as a bus 118. In the preferred embodiment the bus is a RAMBUS™ type, hereinafter referred to as "RBUS".

Figure 2:
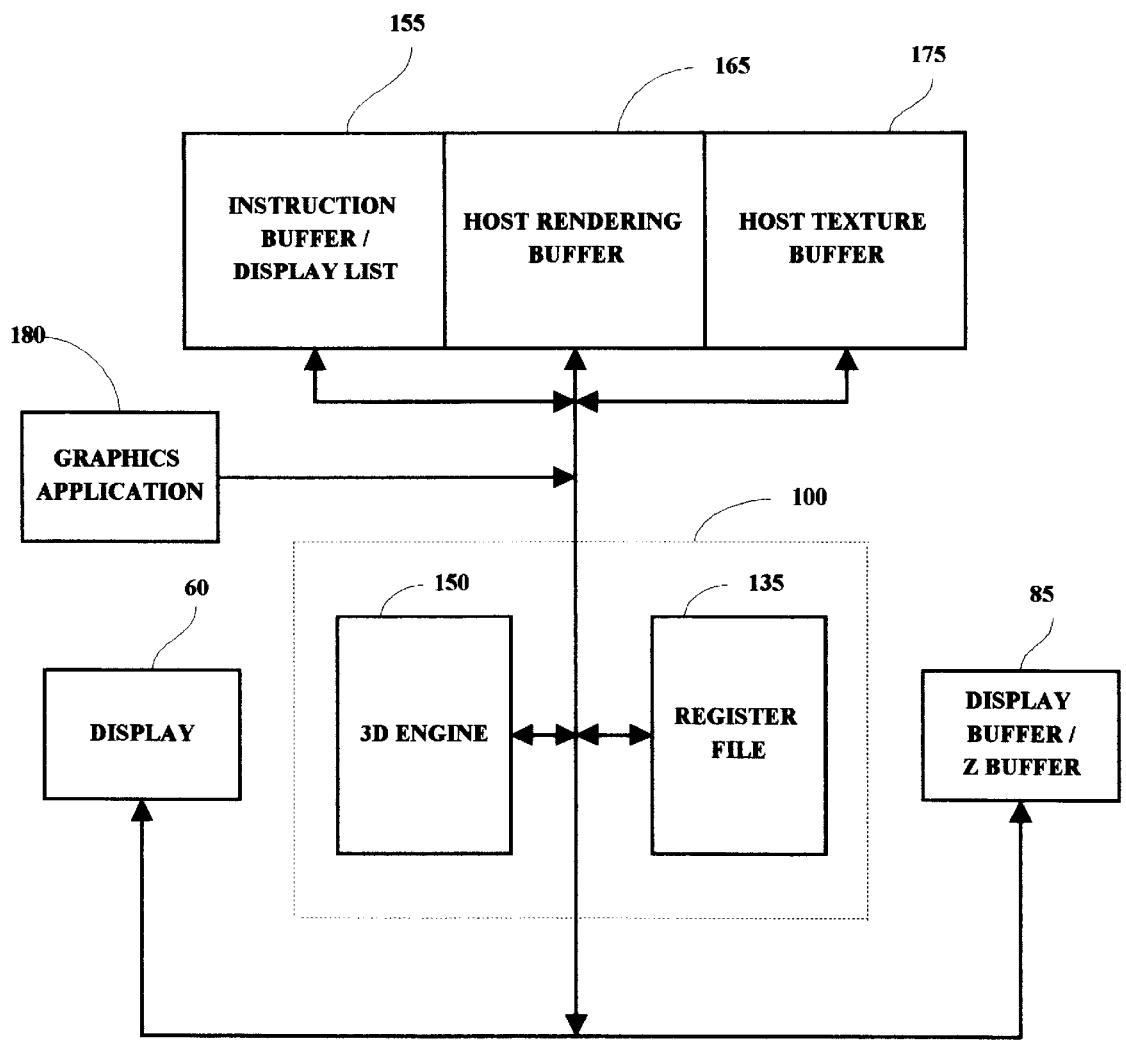
FIG. 2 is a simplified block diagram showing in some detail portions of the graphics processor of FIG. 1, including a bus-mastering unit.

The particular embodiment shown in FIG. 2 is only one of many possible implementations of a graphics system for use in a computer system. FIG. 2 is simplified for purposes of clarity so that many components and control signals are omitted which are not necessary to acquire an understanding of the present invention.

Referring now to FIG. 2, the graphics processor 100 preferably includes a register file 135 and a 2D/3D engine 150 for generating three and two dimensional primitives. The system shown in FIG. 2 includes an instruction buffer 155, a host rendering buffer 165 and a host texture buffer 175. Buffers 155,165 and 175 store the instructions and parameters generated by the graphics application 180. As one skilled in the art will understand, buffers 155, 165 and 175 may reside in the processor 50 or system memory 75 of FIG. 2. The graphics memory 85 of the preferred embodiment is implemented as display and Z buffers.

The register file 135 receives the instructions and display information from buffer 155 for subsequent use by the 2D/3D engine 150. The 2D/3D engine 150 receives the instructions and display parameters from the register file 135 and generates values for each pixel for rendering on display unit 60. The 2D/3D engine 150 stores the pixel data internally in the graphics processor 100 before rendering the pixels to display unit 60 or to the RDRAM 85.

Figure 3:
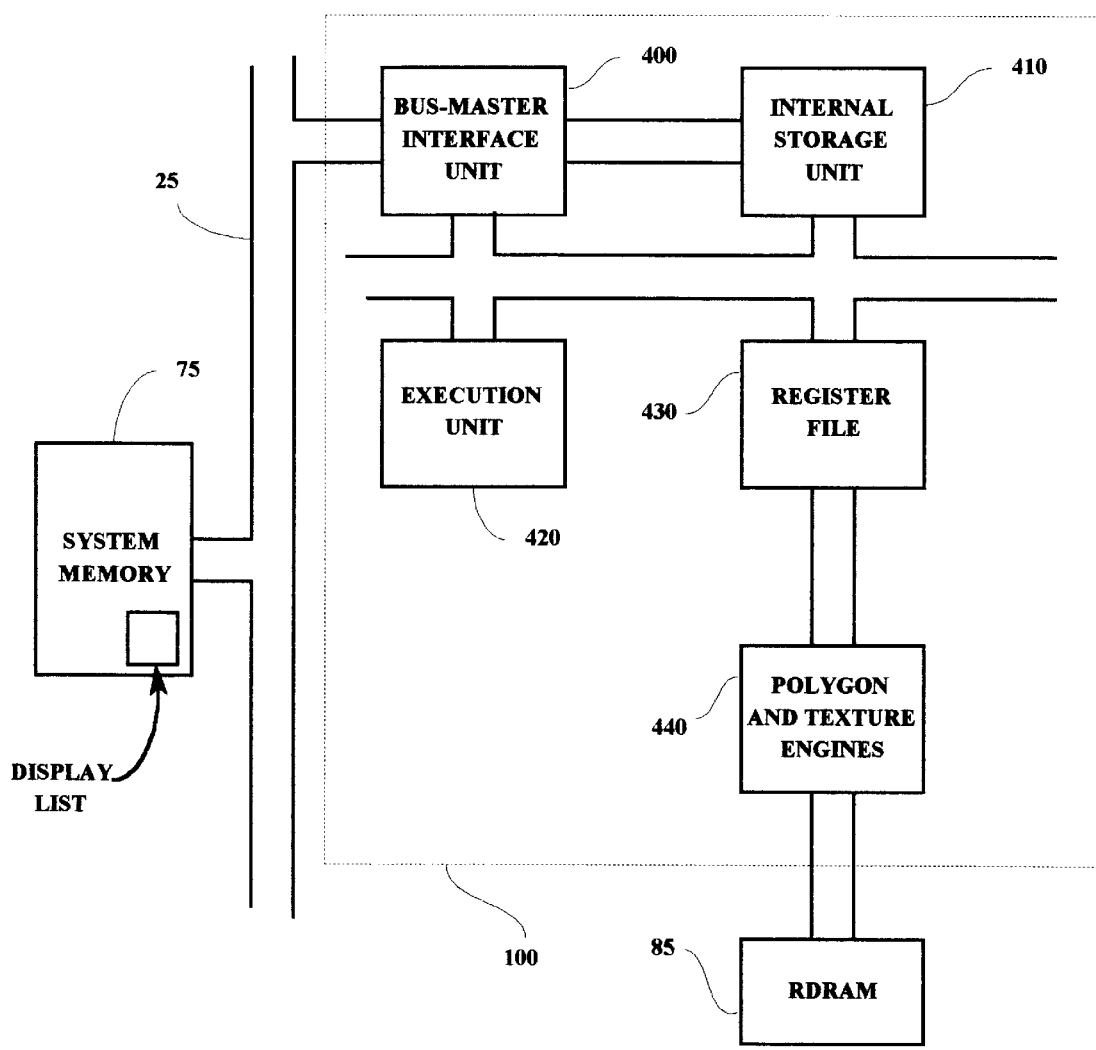
FIG. 3 is a simplified block diagram showing additional detail of the graphics processor of FIG. 2.

Referring now to FIG. 3, the graphics processor 100 preferably includes a bus-master interface unit 400 coupled to a storage unit 410, an execution unit 420, a register file 430 and polygon and texture engines 440. The polygon and texture engines 440 are coupled to the RDRAM 85.

The bus-master interface unit 400 provides interface to the system bus 25. Generally, the bus-master interface unit 400 fetches instructions and the display list and loads the information into the storage unit 410 while the polygon and texture engines 440 are drawing based upon previously fetched instructions.

When the graphics processor 100 is in a bus-master mode, the bus-master interface unit 400 generates a system bus address for reading the display list from system memory 75 and then fills the storage unit 410 with the display list instructions and display list data. The bus-master interface unit 400 also includes logic for enabling the graphics processor 100 to arbitrate for control of the system bus 25.

The execution unit 420 under the direction of the bus-master interface unit 400 transfers the contents of the storage unit 410 to the register file 430 for rendering operations by the polygon and texture engines 440.

The execution unit 420 generally functions to set control states for the graphics processor 100, and further to synchronize operations of the graphics processor subcomponents. In the exemplary embodiment, as long as the RDRAM 85 is available, the execution unit 420 is assigned the highest priority by the arbitration logic in the storage unit 410. Thus, the execution unit 420 is not interrupted while executing an instruction. The execution unit 420 is typically placed in an IDLE mode between each and every "render" instruction. In addition, the execution unit 420 suspends operation when a current executing instruction requires data from the system bus 25 or system memory 75. The execution unit 420 also includes a command feed logic circuit to handle display list instructions provided by the bus-master interface unit 400.

Still referring to FIG. 3, the register file 430 generally comprises registers for every possible value to render any primitive. Thus, to load a display list value into the appropriate registers in the register file 430, each value in the display list has an associated address corresponding to a register in the register file 430.

Once a set of display list values from the storage unit 410 is loaded into the register file 430, the primitive defined by those values is rendered by the polygon and texture engine 440. While the polygon and texture engines 440 are rendering the current primitive from the register file 430, the bus-master interface unit 400 may receive a display list corresponding to the next primitive to be rendered and, if so, loads the display list into the storage unit 410.

Figure 4:
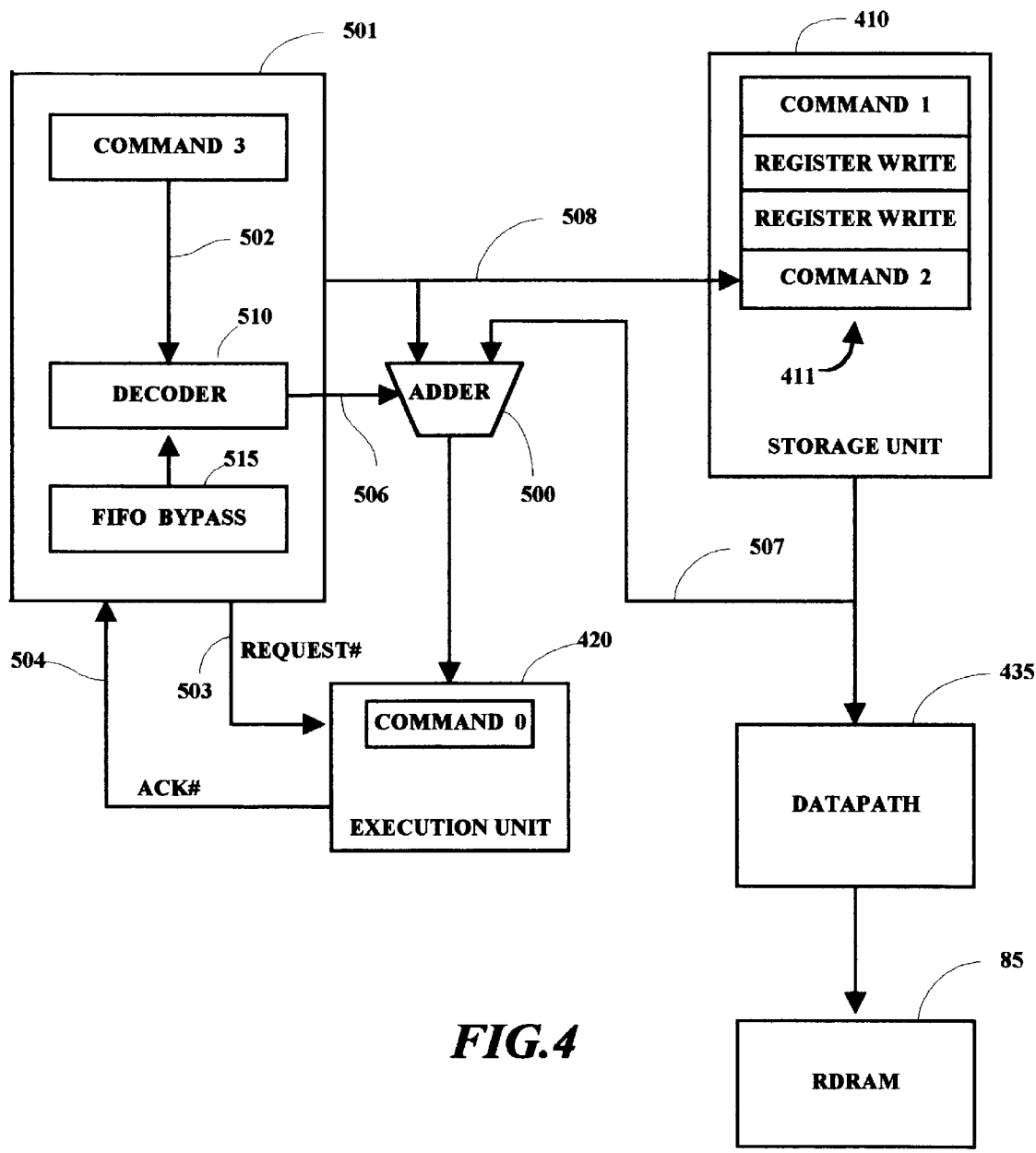
FIG. 4 is a block diagram illustrating an exemplary command decoding methodology in accordance to the teachings of the present invention.

As shown in FIG. 4, a command address bypass logic unit 501 is contained within the bus-master interface unit 400. The bus-master interface unit 400 is coupled to the internal storage unit 410, the execution unit 420 and datapath unit 435. The datapath 435 is connected to the RDRAM 85. An Adder logic circuit 500 receives inputs from the internal storage unit 410 and the bypass logic unit 501, and provides an output to the execution unit 420.

The bus-master interface unit 400 comprises decoder 510 and bypass logic 515. The bus master interface unit 400 may include other components which are not shown here in order not to obfuscate the teachings of the present invention. Decode logic 510 is included in the bus-master interface unit 400 and coupled to the bypass logic 515 to receive commands (e.g. Command 3) from system memory. The fetched command is decoded and passed to the internal storage unit 410 via signal lines 508. The decoder 510 may alternatively pass decoded commands to the execution unit 420 through the Adder 500.

The FIFO BYPASS logic 515 is coupled to the decoder 510 to allow the decoder 510 to be able to bypass writing data to the storage unit 410. The FIFO BYPASS logic 515 also enables the bus-master interface unit 400 to stall passing commands and register writes to the internal storage unit 410 while allowing the execution unit 420 to empty the contents of the storage unit 410. In a preferred embodiment, the bypass logic comprises a register bit which is set "on" or "off" to indicate when to bypass the internal storage unit 410.

In the preferred embodiment, the bus-master interface unit 400 asserts request signal line 503 to the execution unit 420 to pass decoded commands directly to the execution unit 420 for processing.

Still referring to FIG. 4, the storage unit 410 comprises a plurality of First-In-First-Out or FIFO registers 411 for storing the commands pre-fetched by the bus-master interface unit 400 for processing by the execution unit 420. The FIFO registers 411 receive as inputs, decoded commands from the bus-master interface unit 400 via signal lines 508, and pass the stored commands and register writes to the datapath unit 435 and the Adder logic 500 via signal line 507. The FIFO registers 411 within the internal storage unit 410 can also buffer pre-fetched commands in the graphics processor while the execution unit processes previously fetched commands to continue rendering a primitive.

The Adder logic 500 receives as inputs, the decoded fetched commands from the bus-master interface unit 400 and the stored buffered commands in the FIFO registers 411. The Adder logic 500 selectively receives newly fetched commands decoded in the bus-master interface unit 400 or the pre-fetched commands stored in the FIFO registers and passes these commands on to the execution unit 420 for processing. By selectively passing commands and data, the Adder logic 500 is able to maximize the use of the FIFO registers 411 within the internal storage unit 410 by arranging commands that only require fetching data.

In the exemplary embodiment shown in FIG. 4, Command 3 is an instruction which will request data for completion over the system bus 25 from the bus-master interface unit 400. The bus-master interface unit 400 decodes Command 3 and holds off writing the FIFO registers 411 until the FIFO registers 411 are completely emptied by the execution unit 420. Command 3 is then loaded by the execution unit 420. Executing Command 3 causes the bus-master interface unit 400 to fetch data from the system memory which is passed directly to the execution unit 420. Since the bus-master interface unit 400 has stalled passing commands/ register writes into the FIFO registers 411, the FIFO registers 411 are then used to buffer writes to the datapath unit 435. For example, when a three dimensional (3D) rendering is occurring, the graphics processor needs to fetch texture data for a graphics object being rendered. The texture data which takes storage priority is preferably buffered in the FIFO registers and is provided to the execution unit before any new primitive values are fetched. In the case where the texture data is stored in the FIFO registers, the bus-master interface unit 400 will have to bypass the FIFO registers 411 to provide incoming commands to the execution unit to process other primitives being drawn on the computer screen.

The method and apparatus of the present invention has been described in connection with a preferred embodiment as disclosed herein. Although an embodiment of the present invention has been shown and described in detail herein, along with certain variants thereof, many other varied embodiments that incorporate the teachings of the invention may be easily constructed by those skilled in the art, and also included or integrated into a CPU or other larger system integrated circuit or chip. Accordingly, the present invention is not intended to be limited to the specific form set forth herein, but on the contrary, it is intended to cover such alternatives, modifications, and equivalents, as can be reasonably included within the spirit and scope of the invention.

What is claimed is:

1. A graphics processor having an internal storage unit for rendering graphics primitives, the graphics processor comprising:

a bus interface unit for fetching display list instructions representing graphics primitives from an external memory source, said bus interface unit including bus-mastering circuitry to allow the graphics processor to bus-master an external system bus coupled to the graphics processor, said bus interface unit further comprising an address decoding means for decoding commands to determine whether to write commands and data to the internal storage unit;

an internal storage unit coupled to the bus interface unit for internally storing pre-fetched graphics primitive data to be processed in the graphics processor, said internal storage unit comprising a plurality of registers for storing commands and data from said pre-fetched graphics primitive data, wherein the plurality of registers are First-In-First-Out (FIFO) registers and wherein data first received in the plurality of registers is first written out of the plurality of registers;

an execution unit coupled to the bus interface unit and the internal storage unit to process the graphics primitive data;

a bypass logic device coupled to the bus interface unit to selectively pass the graphics primitive data to the internal storage unit and the execution unit wherein if the bus interface unit detects an ongoing processing of commands and data stored in the internal storage unit, any incoming fetched graphics primitive data in the graphics processor are written directly to the execution unit; and a polygon engine for rendering graphics objects representing the graphics primitive data fetched from the external memory source.

2. The graphics processor of claim 1, wherein the bypass logic circuit includes a resume logic circuit to resume command and data writes to the internal storage unit after the internal storage unit is emptied of data by the execution unit.

3. A computer system comprising:

a system bus for communicating data and commands;

a host processor coupled to the system bus for processing the commands and data, the processor generating a display list of graphics primitive parameter data for graphics primitives;

a system memory coupled to the system bus for storing the display list of graphics primitive parameter data; and a graphics processor coupled to the system bus, said graphics processor comprising:

a bus interface unit for fetching the display list of graphics primitive parameter data from the system memory, the bus interface unit providing the graphics processor with bus-mastering capabilities to bus-master the system bus, said bus interface unit further comprising an address decoding means for decoding commands to determine whether to write commands and data to the internal storage unit;

an internal storage unit coupled to the bus interface unit for storing the fetched display list of graphics primitive parameter data from the system memory, said internal storage unit comprising a plurality of registers for storing commands and data from said pre-fetched graphics primitive data, wherein the plurality of registers are First-In-First-Out (FIFO) registers and wherein data first received in the plurality of registers is first written out of the plurality of registers;

an execution unit coupled to the bus interface unit and the internal storage unit to process the graphics primitive data;

a bypass logic device coupled to the bus interface unit to selectively pass the graphics primitive data to the internal storage unit and the execution unit wherein if the bus interface unit detects an ongoing processing of commands and data stored in the internal storage unit, any incoming fetched graphics primitive data in the graphics processor are written directly to the execution unit; and a polygon engine for rendering graphics objects representing the graphics primitive data fetched from the system memory.

4. The computer system of claim 3, wherein the bypass logic circuit includes a resume logic circuit to resume command and data writes to the internal storage unit after the internal storage unit is emptied of data by the execution unit.

5. The computer system of claim 4, wherein the bypass logic circuit includes a stalling logic device to stall command writes to the internal storage unit until data associated with the commands already stored in the internal storage unit have been fetched from the system memory.

6. The computer system of claim 5, wherein the graphics processor further includes an add logic device coupled to the bus interface unit and the internal storage unit to count the number of internal storage locations being written with commands.

7. The computer system of claim 5, wherein the internal storage unit comprises a plurality of First-In-First-Out registers and wherein each of said plurality of registers is six bits wide.

8. A graphics primitive storage bypass system for selectively storing graphics primitive parameter data internally in a graphics processor comprising:

an address command register disposed within a graphics primitive bus interface unit;

a decoding device coupled to the address command register to receive and decode the commands provided in the graphics primitive parameter data;

a bypass device coupled to the decoding circuit to selectively determine where to write the pre-fetched commands internally in the graphics processor; and a adder device coupled to the bypass device for counting the number of storage locations in the internal storage unit storing commands pre-fetched to be processed in the graphics processor, said bypass device being selectively operable for detecting when ongoing processing of the stored commands is continuing, said graphics primitive storage bypass system being selectively operable for directly writing incoming pre-fetched graphics primitive parameter data to an execution unit of said graphics processor when ongoing processing of commands and data stored in said internal storage unit is detected.

9. The graphics primitive storage bypass system of claim 8, further comprising:

a stall device disposed in the bus interface unit to stall the writing of fetched graphics primitive parameter data to the internal storage unit while pre-fetched commands are being processed in the graphics processor.

10. The graphics primitive storage bypass system of claim 9, wherein one bit data values are set to indicate whether to bypass internally storing data in the graphics processor.

11. The graphics primitive storage bypass system of claim 10, wherein the bypass device comprises a one bit wide register.

12. The graphics primitive storage bypass system of claim 11, wherein the bypass device is set to resume command and data writes to the internal storage unit after the internal storage unit is bypassed by a previous data storage operation in the graphics processor.

13. A method of optimizing graphics primitive parameter data storage internally in a graphics processor, said method comprising:

(a) generating a display list of graphics primitive parameter data in a host processor;

(b) prefetching the graphics primitive parameter data for processing in the graphics processor;

(c) selectively storing commands in the display list of graphics primitive parameter data in an internal storage unit of the graphics processor;

(d) detecting when ongoing processing of the stored commands is continuing; and (e) directly writing incoming prefetched graphics primitive parameter data to an execution unit of said graphics processor when ongoing processing of commands and data stored in said internal storage unit is detected.

14. The method of claim 13, and further including stalling storing commands in display list of graphics primitive parameter data internally in the graphics processor.

15. The method of claim 14, and further including resuming storing of commands internally in the graphics processor when ongoing processing of commands and data stored in said internal storage unit is terminated.

* * * * *